United States Patent

[11] 3,596,119

[72] Inventor Herbert Goldmann
 Zug, Switzerland
[21] Appl. No. 876,267
[22] Filed Nov. 13, 1969
[45] Patented July 27, 1971
[73] Assignee Landis & GYR
 Zug, Switzerland
[32] Priority Nov. 27, 1968
[33] Switzerland
[31] 17667/68

[54] ELECTRIC STEPPING MOTOR
 5 Claims, 7 Drawing Figs.
[52] U.S. Cl. .................................. 310/49,
 310/114, 310/156
[51] Int. Cl. ...................................... H02k 37/00
[50] Field of Search .......................................... 310/46, 49,
 112, 114, 156, 162—64; 335/253; 340/378

[56] References Cited
UNITED STATES PATENTS
| | | | |
|---|---|---|---|
| 2,844,316 | 7/1958 | Liebknecht | 310/49 X |
| 3,344,378 | 9/1967 | Wilhelmson | 310/49 X |
| 3,370,189 | 2/1968 | Haydon et al. | 310/156 X |
| 3,456,138 | 7/1969 | Huber | 310/114 X |

Primary Examiner—D F. Duggan
Attorney—Morgan, Finnegan, Durham and Pine

ABSTRACT: An electric stepping motor having a drive motor for rotating the motor shaft through 0—π electrical degrees in response to an applied current pulse and an energy storage system connected to the motor shaft for opposing the rotation of the shaft through less than 0—π electrical degrees and for assisting the rotation of the shaft through greater than π—2π electrical degrees.

PATENTED JUL 27 1971
3,596,119
SHEET 1 OF 2
Fig. 1
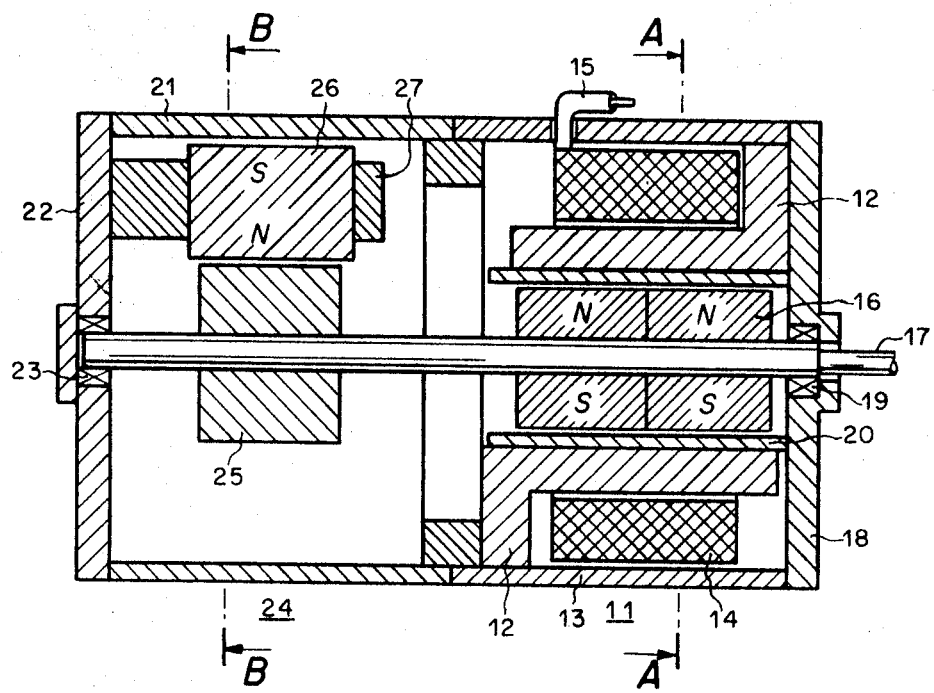
Fig. 2
Fig. 3
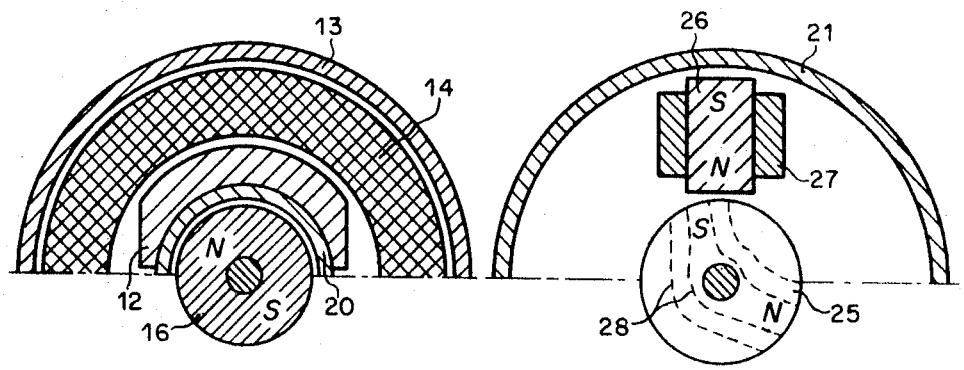
INVENTOR.
HERBERT GOLDMANN
BY
Morgan Finnegan Durham & Pine

PATENTED JUL 27 1971 3,596,119

INVENTOR.
HERBERT GOLDMANN
BY
Morgan Finnegan Durham & Pine

ELECTRIC STEPPING MOTOR

The present invention relates to an electric stepping motor for the turning of a shaft by current pulses, with a single-phase drive motor and a magnetic energy storage system.

The energy storage system of a known electrical stepping motor consists of a permanent-magnet stator with poles spaced axially and spatially apart from each other and of a rotor which is arranged on the shaft which is to be rotated and has similarly axially spaced pole pieces corresponding to the stator poles. This energy storage system, during a first rotation of the shaft through an electrical angle $\Phi_{el} =180°$ as a result of a current pulse at the drive motor has a predominantly negative torque and during the remaining rotation to make up the full electrical angle of rotation $\Phi_{el} =360°$ without the current pulse has a torque which is positive with respect to the given direction of rotation.

The torque obtainable with this known stepper motor is not particularly large for a given structural size. Furthermore, the large weight of the required permanent-magnetic stator and the unfavorable form of the rotor of the energy storage system from the standpoint of manufacture are further disadvantages.

The disadvantages of the known stepper motor are eliminated in accordance with the invention in the manner that the energy storage system consists of a cylindrical permanent-magnet rotor arranged on the shaft to be rotated and of a stationary permanent magnet only one of the poles of which faces the rotor and is in magnetic interaction with same.

A few embodiments of the invention will be explained in further detail with reference to the drawing in which:

FIG. 1 shows a stepper motor in axial section;

FIG. 2 is a section A-A;

FIG. 3 is a section B-B;

Figure 4:
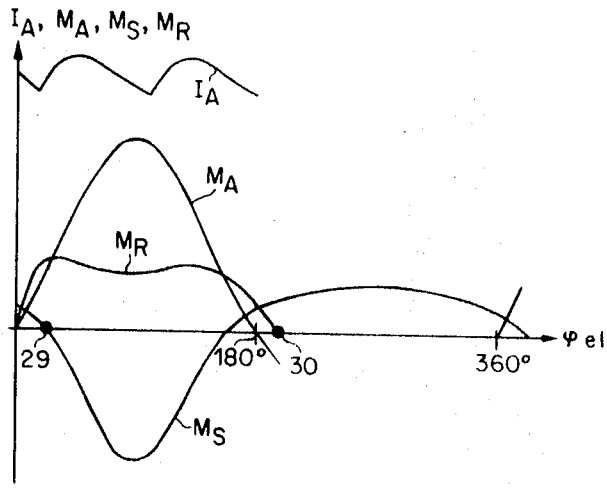
FIG. 4 is a diagram.

FIGS. 1, 2 and 3 will be described simultaneously below.

A single phase drive motor 11 having two stator poles 12 which pass into a stator shell 13 has an exciter winding 14 with lead wires 15. Permanent disc magnets 16 form the rotor of the drive motor 11 and are fastened on a shaft 17 which is centrally supported on a ball bearing 19 and a cover 18 of nonmagnetic material. Between the stator poles 12 and the rotor 16, a tube 20 of electrically conductive material, preferably copper, is inserted coaxially to the rotor 16. The tube 20 cooperates with a rotor 16 to form a damping system.

A magnetically nonconductive cover 22 which receives a ball bearing 23 for supporting the shaft 17 is fastened on the stator of the drive motor 11 via a spacer tube 21 of preferably magnetically conductive material.

An energy storage system 24 consists of a smooth cylindrical permanent-magnet rotor 25 arranged within the spacer tube 21 on the shaft 17 and of a stationary cubic permanent magnet 26 which is fastened on the cover 22 by a mount 27 at an adjustable distance from the rotor 25. The north pole of the permanent magnet faces the rotor 25 and is in magnetic interaction with it while the south pole is directed towards the spacer tube 21. Between the north pole and the rotor 25 preferably only a small air gap is present. The rotor 25 and the permanent magnet 26 are preferably ceramic magnets whereby a high BH product and thus a large storage torque is obtained with the magnet arrangement described.

The rotor 25 which is magnetized laterally on the periphery has asymmetric poles N, S. The course of the magnetic lines of flux in the rotor 25 is indicated in FIG. 3 by the dashed lines 28. The angle between the north pole and an adjacent south pole is preferably 120 or 240 electrical degrees.

The manner of operation of the stepper motor described will be explained below on basis of the diagram shown in FIG. 4.

As soon as a current pulse $I_A$, for instance a ripple direct current produced by rectification of an alternating current arrives at the exciter coil 14 of the drive motor 11, a torque $M_A$ acts on the rotor 16 and turns the shaft 17 by an electric angle of rotation $\Phi_{el} =180°$. In this connection, the rotor 25 of the energy storage system 24 is turned from its stable position designated 29 in FIG. 4 in opposition to its negative storage torque $M_S$ and thereby takes up energy. Since the permanent coils N, S of the rotor 16 have passed under opposite stator poles 12, the shaft 17 remains in a position which is stable for the drive motor 16 and which, depending on the load, is located in the vicinity of the passage 30 through zero of the course of the resultant torque $M_R = M_A + M_S$.

With the current pulse $I_A$ the stabilizing torque $M_A$ also disappears and the shaft 17 as a result of the storage torque $M_S$ at the energy storage system 24 starts to turn further until its rotor 25 comes into the position which is stable with respect to the permanent magnet 26, which is the case after the rotation by an additional 180 electrical degrees. In this second phase of rotation, the energy stored in the energy storage system 24 is again freed.

By the mutual position of the rotors 16 and 25 it is seen to it that neither the stable position 29 nor the stable position 30 corresponds to a deadpoint of the next rotor entering into action.

Due to the fact that only one of the poles of the permanent magnet 26 faces the asymmetrically magnetized rotor 25 and is in magnetic interaction with it, the result is obtained that the angular range with positive storage torque is greater than with negative storage torque, the storage torque being at least approximately constant in its positive range. In this way a high load-bearing capacity of the stepper motor is obtained.

When using a spacer tube 21 of magnetically conductive material, there is obtained a certain bunching of the lines of flux of the magnetic return in the energy storage system 24 which results in a further increase in the torque which is obtainable.

A certain damping in order to avoid oscillations in the stable positions can also be desirable when using rotors 16 and 25 of ceramic magnets of low specific gravity. This can be effected in a simple manner by the copper tube 20 in which the energy of the moment of inertia is degraded by short circuit currents.

Figure 5:
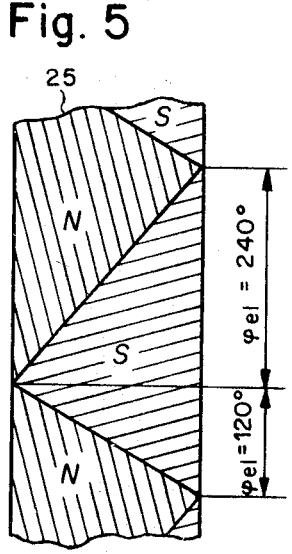
FIG. 5 is the developed view of a rotor shell of another embodiment.

Another type of magnetization of the rotor 25 is shown in FIG. 5. The north and south poles form triangular surfaces on the winding of the rotor shell, the angle between the centers of gravity of a north-pole triangular surface and the adjacent south-pole triangular surface being advantageously 120 and 240 electrical degrees respectively.

Figure 6:
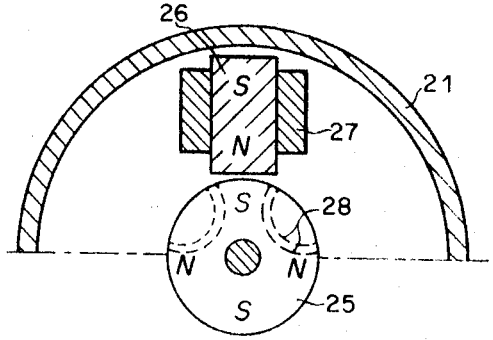
FIG. 6 is a section B-B through a stepper motor of still another embodiment.
Figure 7:
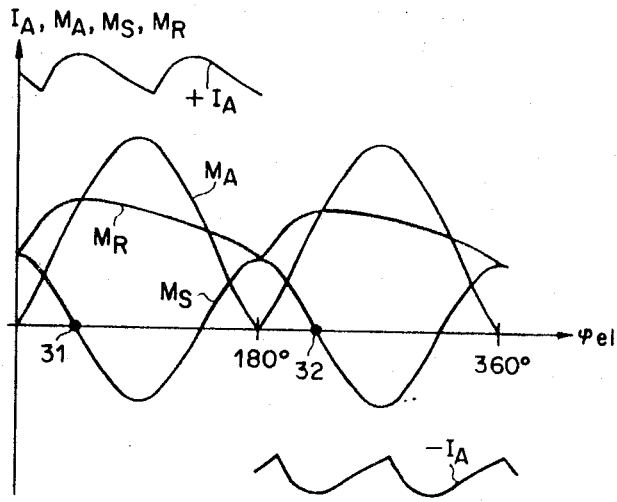
FIG. 7 is a diagram which applies to the stepper motor of FIG. 6.

The stepping motor described can be used for so-called double-current control when the rotor 25 of the energy storage system 24 in accordance with FIG. 6 is symmetrically magnetized and the number of pairs of poles thereof is selected as a whole-number multiple of that of the drive motor 11. In this connection, the number of pairs of poles of the rotor 25 is preferably twice as great as that of the drive motor 11. For this type of operation, there applies the diagram of FIG. 7, in which the variables $I_A$, $M_A$, $M_S$ and $M_R$ are illustrated as follows as a function of the angle of rotation $\Phi_{el}$: As soon as a positive current pulse $+I_A$ arrives at the exciting coil 14 of the drive motor 11, the torque $M_A$ acts on the rotor 16 and turns the shaft 17 by 180 electrical degrees. In this connection, the rotor 25 of the energy storage system 24 is turned from its stable position 31 against its negative storage torque $M_S$ and thereby takes up energy which at the end of this phase of rotation is liberated again by a positive torque $M_S$ which is superimposed on the drive torque $M_A$. The shaft 17 now remains in a position which is stable for the drive motor 11 which, depending on the load, lies between the angle of rotation $\Phi_{el} =180°$ and a position 32 which is stable for the energy storage system 24.

With the control pulse $+I_A$ the drive torque $M_A$ also disappears but the shaft 17 remains stationary in the vicinity of the stable position 32.

As soon as now, however, a negative current pulse $-I_A$ arrives at the exciting coil 14, a positive drive torque $M_A$ is again produced which turns the rotor 16 further so that the shaft 17 again assumes its stable starting position.

Of course, the drive motor 11 can be developed with a plurality of poles when the rotor 25 of the energy storage system 24 is suitably adapted.

What I claim:

1. A stepping motor comprising:
a shaft;
a drive motor operatively coupled to rotate said shaft a predetermined angular distance in response to an applied current pulse; and
an energy storage system operatively coupled to said shaft including
a magnetized rotor providing at least a pair of magnetic poles on the surface of said rotor,
said poles being nonsymmetrically disposed so that the angular rotation of negative torque during which energy is stored is less than the angular rotation of positive torque during which energy is released, and
a stator magnet so disposed so that only one of the poles of said stator magnet faces and interacts with the nonsymmetrical magnetic poles on the surface of said rotor.

2. A stepping motor comprising:
a shaft;
a drive motor operatively coupled to rotate said shaft a predetermined angular distance in response to an applied current pulse; and
an energy storage system operatively connected to said shaft including
a magnetized rotor providing at least a pair of magnetic poles on the surface of said rotor,
said poles including interleaved north and south poles disposed laterally on said rotor surface, and
a stator magnet so disposed so that only one of the poles of said stator magnet faces and interacts with the magnetic poles on the surface of said rotor.

3. A stepping motor according to claim 1 wherein the separation between said rotor and said stator magnet is adjustable.

4. A stepping motor according to claim 2 wherein said interleaved poles are triangular in shape.

5. A stepping motor according to claim 1 further including a housing of magnetic material surrounding said rotor and said stator magnet, and wherein
the gap between said rotor and stator is small; and
the pole of said stator magnet not facing said rotor is directed toward said housing.